(12) United States Patent
Kim et al.

(10) Patent No.: US 6,466,529 B1
(45) Date of Patent: Oct. 15, 2002

(54) OPTICAL PICKUP ASSEMBLY AND METHOD OF DETECTING TILT

(75) Inventors: Seok-jung Kim, Suwon (KR);
Yong-hoon Lee, Suwon (KR);
Tae-kyung Kim, Suwon (KR);
Jang-hoon Yoo, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 76 days.

(21) Appl. No.: 09/680,463

(22) Filed: Oct. 6, 2000

(30) Foreign Application Priority Data

Oct. 21, 1999 (KR) .............................................. 99-45847

(51) Int. Cl.⁷ ................................................. G11B 7/00
(52) U.S. Cl. ................................ 369/44.32; 369/44.15; 369/53.19; 369/254
(58) Field of Search ........................... 369/44.14, 44.15, 369/44.32, 53.19, 44.16, 53.14, 53.42, 112.01, 112.23, 251, 253, 254

(56) References Cited

U.S. PATENT DOCUMENTS

| | | | | |
|---|---|---|---|---|
| 5,430,699 A | * | 7/1995 | Matsubara et al. | 369/53.19 |
| 5,777,972 A | * | 7/1998 | Furusawa | 369/44.14 |
| 6,295,255 B1 | * | 9/2001 | Seo et al. | 369/44.15 |
| 6,341,104 B1 | * | 1/2002 | Yamaguchi et al. | 369/44.15 |

* cited by examiner

Primary Examiner—Paul W. Huber
(74) Attorney, Agent, or Firm—Staas & Halsey LLP

(57) ABSTRACT

An optical pickup assembly having an elastically supported tilt mechanism. The optical pickup assembly includes a bobbin at which an objective lens is mounted and an elastic support member which supports the bobbin in elastic motion with respect to a holder installed at a base. A focus coil and a tracking coil are installed at the bobbin and form a conducting path for driving the objective lens in a focusing direction and a tracking direction. Tilt coils are installed at one side of the bobbin and form a conductive path for driving tilt of the objective lens. A first magnet and a first yoke generate an electromagnetic force to driving the objective lens together with the current carrying focus coil and tracking coil. A second magnet and a second yoke generate an electromagnetic force to driving the objective lens together with the current carrying tilt coils. A position detecting sensor measures relative inclination of the objective lens with respect to a disk, and a balance member coupled to the bobbin to balance the weight of the tilt coils by applying weight corresponding to the weight of the tilt coils at positions symmetrically opposite to the positions of the tilt coils.

21 Claims, 5 Drawing Sheets

OPTICAL PICKUP ASSEMBLY AND METHOD OF DETECTING TILT

CROSS-REFERENCE TO RELATED APPLICATIONS

This application claims the benefit of Korean Application No. 99-45847, filed Oct. 21, 1999, in the Korean Patent Office, the disclosure of which is incorporated herein by reference.

BACKGROUND OF THE INVENTION

1. Field of the Invention

The present invention relates to an optical pickup assembly, and more particularly, to an optical pickup assembly having an improved structure for tilt control of an objective lens.

2. Description of the Related Art

In general, a disk player such as a CDP (compact disk player) or a DVDP (digital versatile disk player) which records information on or reproduces information from a disk includes an optical pickup assembly for recording and reproducing by emitting light to a disk and receiving light reflected therefrom while moving across the disk. The optical pickup assembly is usually provided with a controlling means for driving a bobbin at which an optical system including an objective lens is mounted in a focusing direction and a tracking direction, to perform focusing and tracking control so that light passing through the objective lens can be focused at a precise position on the disk. Recently, an optical pickup assembly which can perform tilt control in addition to focusing and tracking control is required. With tilt control, when a disk is inclined, the optical pickup assembly can be tilted corresponding to the inclination of the disk so that light is incident on the disk parallel to the normal.

FIG. 1 shows an optical pickup assembly having a conventional tilt control mechanism. As shown in the drawing, in the conventional tilt control mechanism, an optical pickup assembly including an objective lens 11 is installed as a whole at a pivot shaft 21 of a base 20 to be capable of pivoting. A degree of inclination of a disk 1 is measured by sensors 12 and 13 and then a tilt motor 30 is driven to tilt the entire optical pickup assembly 10 by a corresponding angle. Reference numeral 40 denotes a feeding motor for reciprocating the base 20 across the disk 1. However, in the tilt control mechanism having the above structure, since the optical pickup assembly 10 is installed to pivot as a whole, and the tilt motor 30 is additionally installed outside the optical pickup assembly 10, the overall system is large and complicated, which is contrary to the current trend of making systems light and small. Thus, an optical pickup assembly having a light and small structure with which tilt control can be stably performed is required.

SUMMARY OF THE INVENTION

To solve the above problems, it is an object of the present invention to provide an optical pickup assembly with a simple structure which can stably perform tilt control.

Additional objects and advantages of the invention will be set forth in part in the description which follows, and, in part, will be obvious from the description, or may be learned by practice of the invention.

Accordingly, to achieve the above and other objects, there is provided an optical pickup assembly which includes a bobbin at which an objective lens is mounted. An elastic support member supports the bobbin to move elastically with respect to a holder installed at a base. A focus coil and a tracking coil are installed at the bobbin and form a conducting path to drive the objective lens in a focusing direction and a tracking direction. Tilt coils are installed at one side of the bobbin and form a conductive path for driving a tilt of the objective lens. A first magnet and a first yoke generate an electromagnetic force to drive the objective lens together with the current carrying focus coil and tracking coil. A second magnet and a second yoke generate an electromagnetic force to driving the objective lens together with the current carrying tilt coils. A position detecting sensor measures relative inclination of the objective lens with respect to a disk, and a balance member coupled to the bobbin balances the weight of the tilt coils by applying weight corresponding to the weight of the tilt coils at positions symmetrically opposite to the positions of the tilt coils.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENTS

Figure 1:
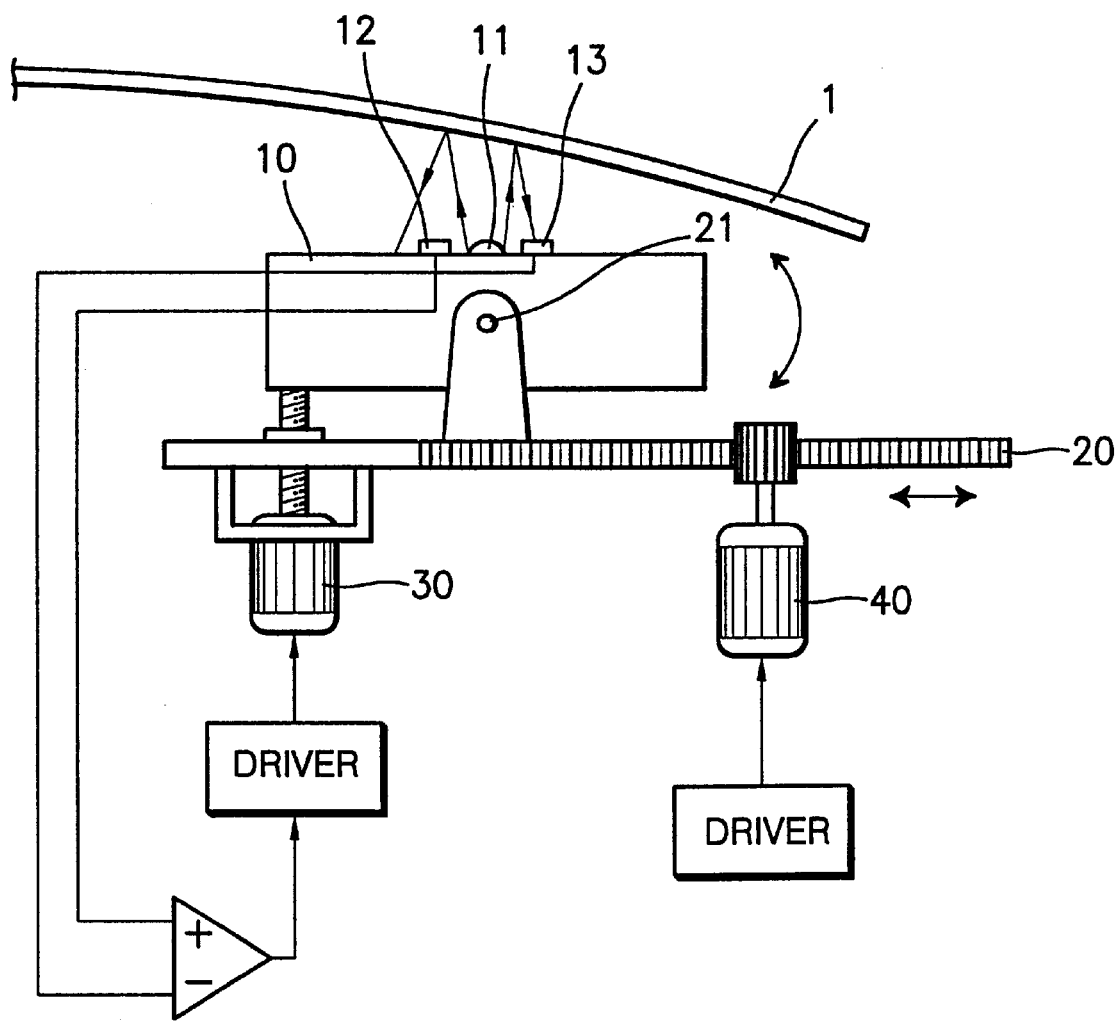
FIG. 1 is a view showing the conventional optical pickup assembly.

Reference will now be made in detail to the present preferred embodiments of the present invention, examples of which are illustrated in the accompanying drawings, wherein like reference numerals refer to like elements throughout.

Figure 2:
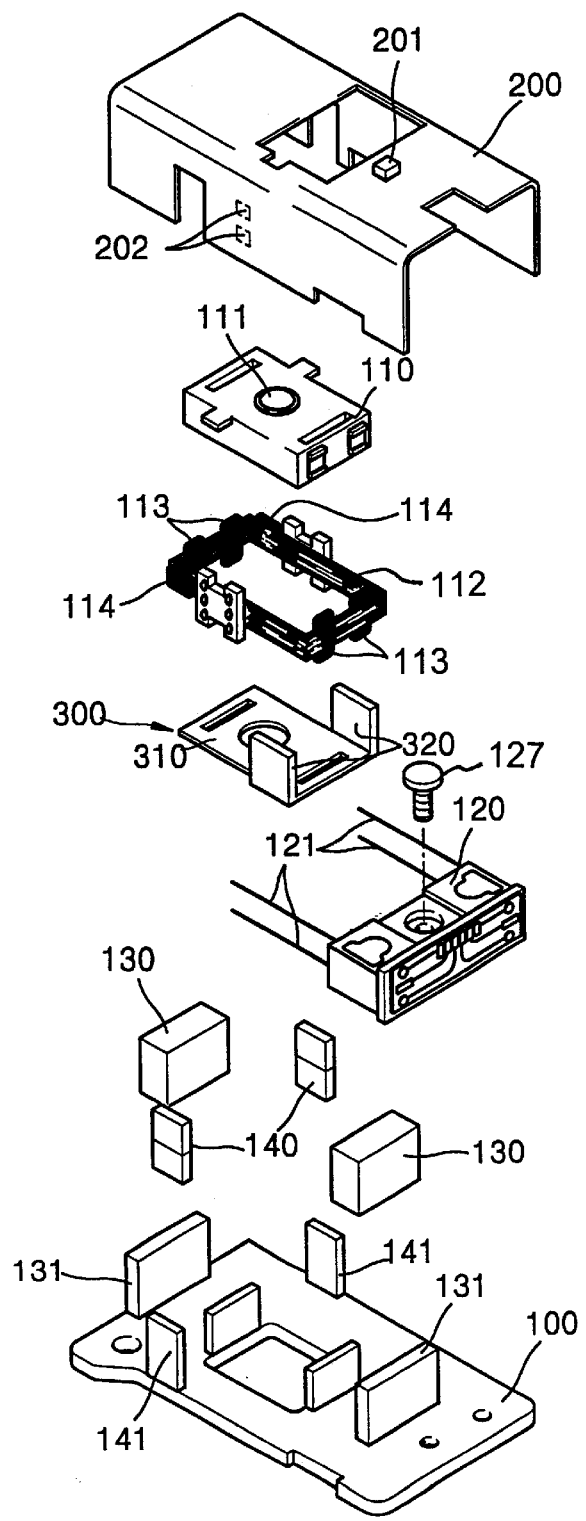
FIG. 2 is an exploded perspective view showing an optical pickup assembly according to the present invention.
Figure 3:
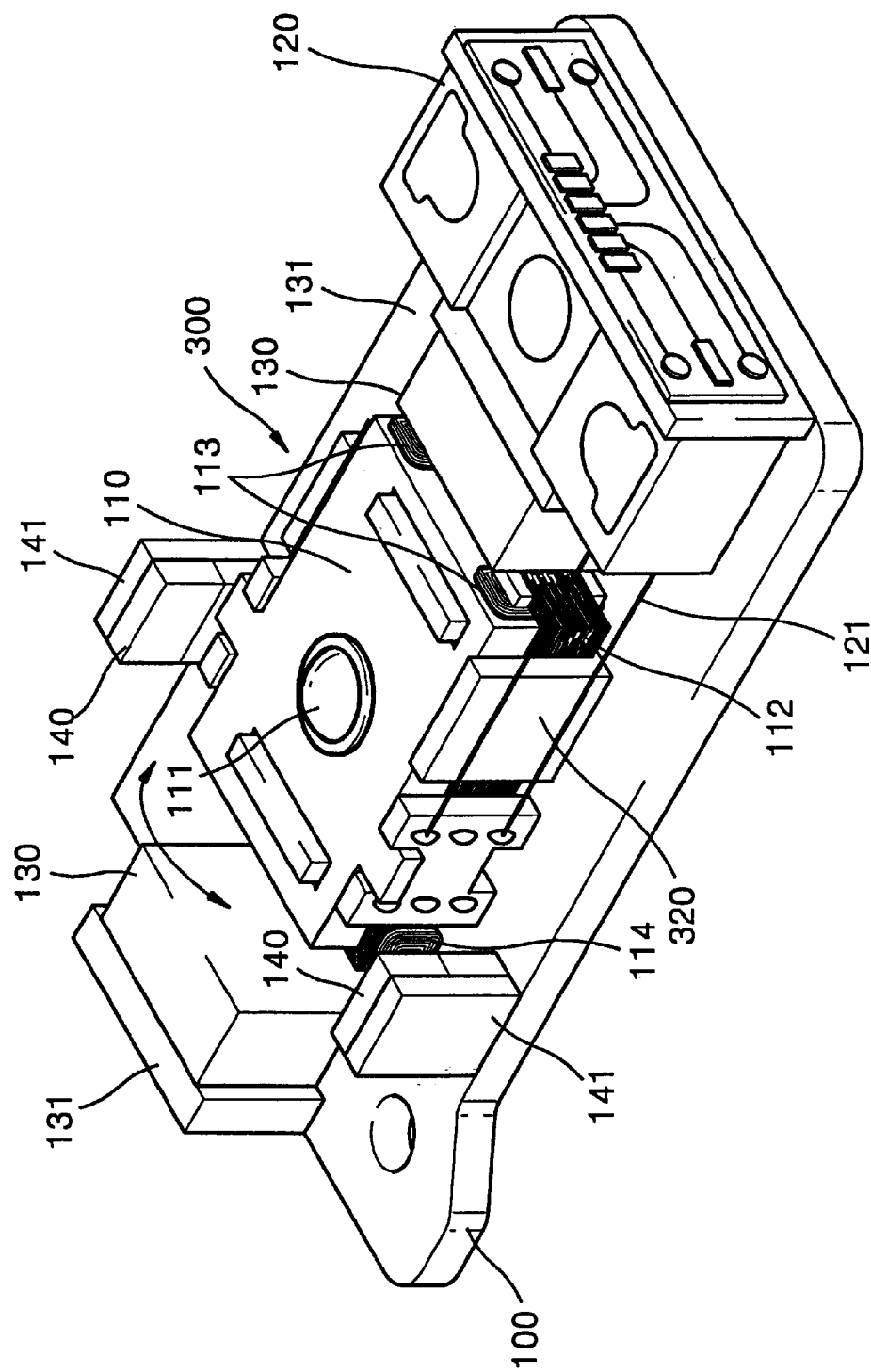
FIG. 3 is a perspective view showing the assembled optical pickup assembly illustrated in FIG. 2, except for the cover member.

Referring to FIGS. 2 and 3, in an optical pickup assembly according to the present invention, a holder 120 is fixedly installed on a base 100 with fastener 127, and a bobbin 110 at which an objective lens 111 is mounted is elastically and movably supported at the holder 120 by an elastic support member 121. A focus coil 112 and tracking coils 113 for aligning the objective lens 111 in a focusing direction and a tracking direction are installed at the bobbin 110. A first magnet 130 and a first yoke 131 for magnetic interaction with the current carrying focus and tracking coils 112 and 113 are installed at the base 100. Tilt coils 114 for tilt driving the objective lens 111 in a direction indicated by an arrow of FIG. 3 are installed at two adjacent corners of the bobbin 110. Pivoting in the direction indicated by the arrow, that is, a tilt action, is performed due to interaction between the current carrying tilt coils 114 and the second magnets 140 and yokes 141 installed on the base 100. Here, the second magnets 140 are formed in pairs and magnetized in the opposite directions to one another, as shown in FIG. 4, and installed at the upper and lower portions of each of the yokes 141 to face the upper and lower portions of each of the tilt coils 114.

Figure 4:
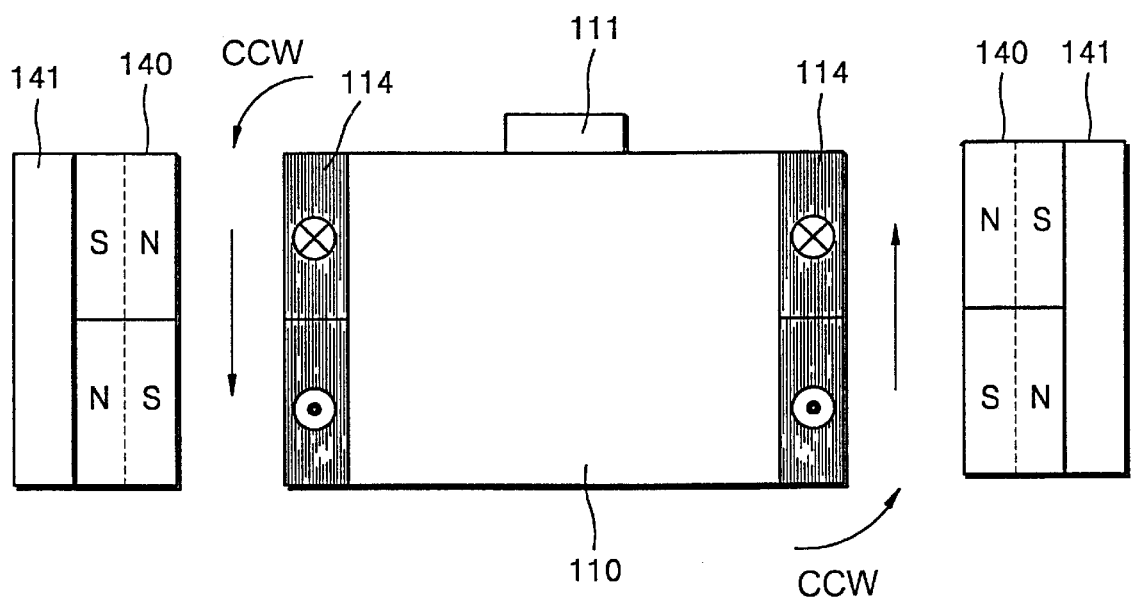
FIG. 4 is a view for explaining the operational principle of the tilt mechanism of the optical pickup assembly shown in FIG. 2.

In this state, when current flows through the tilt coils 114, the bobbin 110 is inclined counterclockwise as shown by the arrow CCW in FIG. 4 according to Fleming's left hand rule.

When current flows in the opposite direction, the bobbin 110 is inclined clockwise. Reference numeral 200 (See FIG. 2) denotes a cover member for covering members including the bobbin 110 and the holder 120 installed on the base 100. First and second position detecting sensors 201 and 202, for measuring relative inclination between the objective lens 111 and a disk (not shown), are installed on the cover member 200. The first position detecting sensor 201 is installed on the upper and outer surface of the cover member 200 to measure inclination of the disk with respect to the cover member 200. The second position detecting sensor 202 is installed on the side and inner surface of the cover member 200 to measure inclination of the objective lens 111 with respect to the cover member 200. Thus, values measured by the sensors 201 and 202 are compared with each other to calculate relative inclination between the disk and the objective lens 111. Then, current is applied to the tilt coils 114 to perform tilt control as discussed below relating to FIG. 5.

It is a characteristic feature of the present invention that a balance member 300 for A balancing the weight of the tilt coils 114 is installed under the bobbin 110. The balance member 300 comprises a base panel 310 disposed under the bottom of the bobbin 110 and side panels 320 disposed at the sides of the bobbin 110. The side panels 320 apply weight corresponding to the weight of the tilt coils 114 at the positions symmetrical to the positions of the tilt coils 114. Thus, the weight of the tilt coils 114 is balanced by the weight of the side panels 320 of the balance member 300 so that the bobbin 110 can be maintained in a balanced state. The reason for installing the balance member 300 is that, when the bobbin 110 loses its balance and is inclined in one direction due to the weight of the tilt coils 114, the load on all control mechanisms, including focus control, tracking control and tilt control, increases. Thus, when the balance member 300 is installed, the balance of the bobbin 110 is maintained so that the above controls can be stably performed.

The side panel 320 of the balance member 300 can also be used as a reflection plate for measuring inclination of the second position detecting sensor 202.

As described above, in the optical pickup assembly according to the present invention, since the structure for tilt control is simple, the assembly can be manufactured to be slim and light. Also, by installing the balance member to balance the weight distribution of the bobbin, control can be stably performed.

Figure 5:
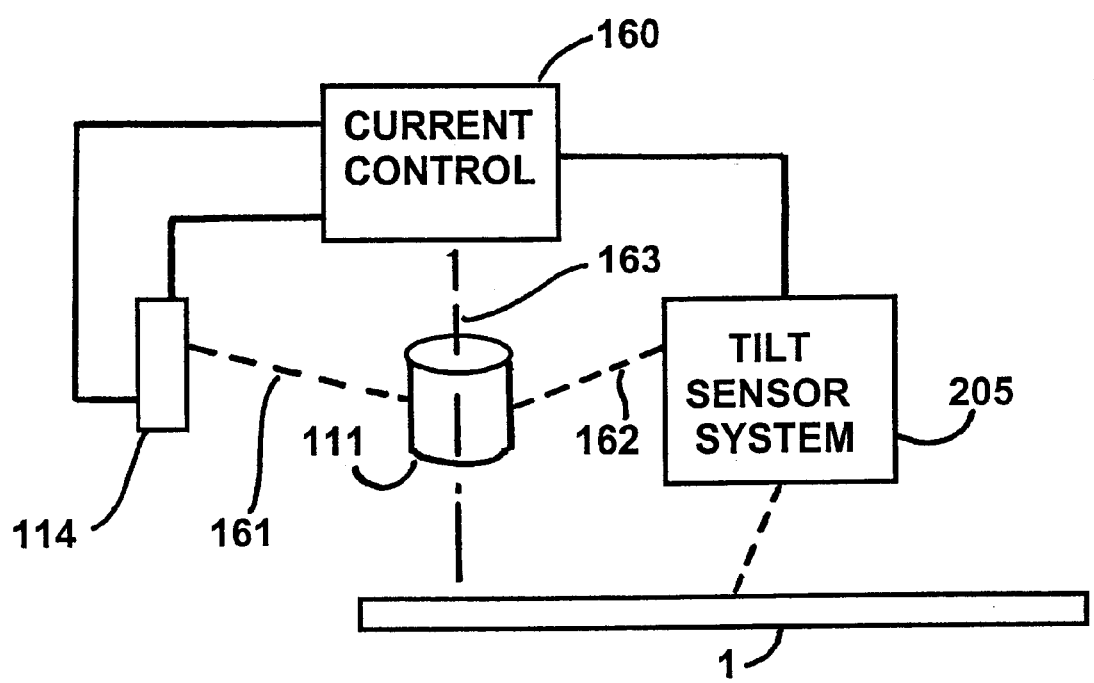
FIG. 5 is schematic showing current control for the tilt mechanism.

Referring now to FIG. 5, a schematic representation of a tilt control in accordance with the present invention is shown. An objective lens 111 having an optical axis 163 is coupled with a tilt coil 114 and with a tilt detector system 205 as illustrated by lines 161 and 162, respectively. The tilt coil 114 is offset from the optical axis 163. The tilt detection system 205 may include position sensors 201 and 202 as shown in FIG. 2 and such other circuitry as may be necessary to output a current command to current control 160. The tilt detection system 205 detects an angle between the optical axis 163 and a disk 1. The current control 160 controls a current to the tilt coil 114 which in conjunction with magnets 140 (FIG. 2) produces an electromagnetic force to effect tilt control of the optical axis 163 of objective lens 111 with respect to the disk 1.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. An optical pickup assembly for an optical disk, comprising:

a base;

a holder mounted on the base;

a bobbin;

an objective lens mounted on the bobbin;

an elastic support member which supports the bobbin in elastic motion with respect to the holder;

a focus coil and a tracking coil installed on the bobbin;

a pair of tilt coils installed on the bobbin;

a first magnet and a first yoke which generate an electromagnetic force together with a current flowing in the focus coil and/or tracking coil, to drive the objective lens in focusing and/or tracking directions respectively;

a second magnet and a second yoke which generates an electromagnetic force together with a current flowing in the tilt coils to drive the objective lens in a tilt direction;

a sensor which measures relative inclination of the objective lens with respect to the optical disk; and a balance member coupled to the bobbin to balance a weight of the tilt coils by applying weight corresponding to the weight of the tilt coils at positions symmetrically opposite to the positions of the tilt coils.

2. The assembly as claimed in claim 1, wherein the balance member comprises:

a base panel disposed between the base and the bobbin; and side panels perpendicularly extending from the base panel and disposed at the sides of the bobbin symmetrically opposite to the tilt coils.

3. An optical pickup assembly for an optical disk, comprising:

a holder;

a bobbin;

an objective lens mounted on the bobbin;

an elastic support member which supports the bobbin in elastic motion with respect to the holder;

a tilt coil installed at a side of the bobbin and positioned a greater distance from the holder than the objective lens;

a magnet which generates an electromagnetic force together with a current flowing in the tilt coil to drive the objective lens; and a balance member attached to the bobbin and positioned a lesser distance from holder than the objective lens, to balance a weight of the tilt coil about an axis.

4. The optical pickup as claimed in claim 3, further comprising a mounting base, the holder attached to the mounting base.

5. The optical pickup as claimed in claim 3, wherein the balance member applies weight corresponding to the weight of the tilt coil at a position symmetrically opposite the objective lens from the tilt coil.

6. The optical pickup as claimed in claim 4, wherein the balance member comprises:

a base panel disposed between the mounting base and the bobbin; and a side panel perpendicularly extending from the base panel and disposed at a side of the bobbin.

7. The optical pickup as claimed in claim 3, further comprising a sensor system which measures relative inclination of the objective lens with respect to the disk.

8. The optical pickup as claimed in claim 7, wherein the sensor system further comprises:

a first sensor which measures a relative angle between the objective lens and the holder; and a second sensor which measures a relative angle between the holder and the disk.

9. The optical pickup as claimed in claim 3, further comprising:
   a second tilt coil installed at a second side of the bobbin; and
   a second magnet which generates an electromagnetic force together with a current flowing in the second tilt coil to drive the objective lens.

10. The optical pickup as claimed in claim 9, further comprising a mounting base, the holder attached to the mounting base.

11. The optical pickup as claimed in claim 9, further comprising a second balance member coupled to the bobbin to balance a weight of the second tilt coil about the axis.

12. The optical pickup as claimed in claim 10, wherein the balance member comprises:
   a base panel disposed between the mounting base and the bobbin; and
   first and second side panels perpendicularly extending from the base panel and disposed at opposite sides of the bobbin.

13. The optical pickup as claimed in claim 3, further comprising:
   at least one of a focus coil and a tracking coil affixed to the bobbin; and
   at least one second magnet to generate an electromagnetic force together with a current flowing through the at least one of the focus coil and/or the tracking coil to drive the objective lens.

14. The optical pickup as claimed in claim 9, further comprising:
   at least one of a focus coil and a tracking coil affixed to the bobbin; and
   at least one third magnet to generate an electromagnetic force together with a current flowing through the at least one of the focus coil and/or the tracking coil to drive the objective lens.

15. An optical pickup assembly for an optical disk, comprising:
   a holder;
   a bobbin;
   an objective lens mounted on the bobbin;
   an elastic support member which supports the bobbin in elastic motion with respect to the holder;
   first and second tilt coils installed at first and second sides, respectively, of the bobbin;
   first and second magnets which generate respective electromagnetic forces together with first and second currents flowing in the first and second tilt coils, respectively, to drive the objective lens;
   a mounting base;
   a balance member to balance a weight of the tilt coils about an axis, the balance member comprising a base panel and first and second side panels, the base panel disposed between the mounting base and the bobbin and the first and second side panels extending from the base panel and disposed at first and second sides of the bobbin; and
   a sensor system which measures relative inclination of the objective lens with respect to the disk, the sensor system further comprising a first sensor which measures a relative angle between the objective lens and the holder and a second sensor which measures a relative angle between the holder and the disk,
   wherein at least one of the first and second side panels is optically reflective and assists in measuring the relative inclination of the objective lens.

16. An optical pickup assembly for an optical disk, comprising:
   a holder;
   an objective lens having an optical axis and elastically suspended from the holder;
   first and second tilt coils which are coupled to the objective lens and offset a greater distance from the holder than the objective lens;
   first and second magnets which generate electromagnetic forces together with currents flowing in the first and second tilt coils, respectively, to drive the objective lens in a tilt direction;
   a weight balance member coupled to the objective lens and offset a lesser distance from the holder than the first and second tilt coils, to balance a weight of the tilt coils.

17. The optical pickup as claimed in claim 16, further comprising:
   a sensor system which measures relative tilt of the optical axis with respect to the disk; and
   a current control with supplies current to the tilt coils, to control the relative tilt of the optical axis.

18. An optical pickup assembly for an optical disk, comprising:
   a bobbin having a surface with first and second sides and first and second ends and a central axis perpendicular to the surface;
   an objective lens operative along the central axis of the bobbin;
   a focus coil wound around the central axis of the bobbin to drive the objective lens in a focusing direction;
   first and second tracking coils affixed at the first and second ends of the bobbin, respectively;
   a tilt coil affixed at the first side of the bobbin and between the central axis and the first end of the bobbin; and
   a balance member affixed at the second side of the bobbin and between the central axis and the second end of the bobbin.

19. The optical pickup assembly as claimed in claim 18, further comprising
   another tilt coil affixed at the second side of the bobbin and between the central axis and the first end of the bobbin; and
   another balance member affixed at the first side of the bobbin and between the central axis and the second end of the bobbin.

20. An optical pickup assembly for an optical disk, comprising:
   a bobbin having a surface with first and second sides and first and second ends and a central axis perpendicular to the surface;
   an objective lens operative along the central axis of the bobbin;
   a tilt coil affixed at the first side of the bobbin and between the central axis and the first end of the bobbin; and
   a balance member affixed at the second side of the bobbin and between the central axis and the second end of the bobbin.

21. The optical pickup as claimed in claim 20, further comprising:
   a sensor system which measures inclination of the objective lens with respect to the disk; and
   wherein the balance member comprises an optically reflective surface which assists the sensor system in measuring a relative inclination of the objective lens.

* * * * *